(12) United States Patent
Wilde et al.

(10) Patent No.: US 8,097,108 B2
(45) Date of Patent: Jan. 17, 2012

(54) METHOD AND APPARATUS FOR FORMING A FIREWORTHY LAMINATE

(75) Inventors: J. Christopher Wilde, Mill Creek, WA (US); Brian J. Wimer, Bothell, WA (US); Kris E. Langkow, Snohomish, WA (US)

(73) Assignee: The Boeing Company, Chicago, IL (US)

(*) Notice: Subject to any disclaimer, the term of this patent is extended or adjusted under 35 U.S.C. 154(b) by 1269 days.

(21) Appl. No.: 11/194,498

(22) Filed: Aug. 1, 2005

(65) Prior Publication Data

US 2006/0280917 A1    Dec. 14, 2006

Related U.S. Application Data

(60) Provisional application No. 60/688,414, filed on Jun. 8, 2005, provisional application No. 60/688,413, filed on Jun. 8, 2005.

(51) Int. Cl.
*B32B 37/00* (2006.01)

(52) U.S. Cl. .......... 156/182; 156/71; 156/277; 244/125; 244/129.2; 244/133; 428/201

(58) Field of Classification Search ............... 428/195.1, 428/201, 203, 204, 205; 156/71, 182, 277; 244/125, 129.2, 133
See application file for complete search history.

(56) References Cited

U.S. PATENT DOCUMENTS

| | | | | |
|---|---|---|---|---|
| 4,409,280 A | * | 10/1983 | Wiley et al. | 428/203 |
| 4,693,926 A | * | 9/1987 | Kowalski et al. | 428/204 |
| 4,943,680 A | * | 7/1990 | Ellison et al. | 427/154 |
| 5,536,539 A | * | 7/1996 | Ellison et al. | 428/31 |
| 5,897,735 A | | 4/1999 | Peskin | |
| 5,942,330 A | * | 8/1999 | Kelley | 428/423.1 |
| 6,348,117 B1 | * | 2/2002 | Tribo et al. | 156/245 |
| 2002/0182957 A1 | * | 12/2002 | Levenda | 442/173 |
| 2005/0052516 A1 | | 3/2005 | Wilde et al. | |

FOREIGN PATENT DOCUMENTS

EP    1 108 753    6/2001

OTHER PUBLICATIONS

Merriam-Webster Online dictionary definition of "adjacent." Imported as adjacent_def.pdf.*

* cited by examiner

*Primary Examiner* — Gerard Higgins

(74) *Attorney, Agent, or Firm* — Harness, Dickey & Pierce, P.L.C.

(57) ABSTRACT

A laminate is provided for forming an aesthetically pleasing fire worthy exterior surface on an object, for example a decorative interior sidewall used in a commercial aircraft. A first film layer forms an exterior surface of the sidewall, and an ink layer is disposed adjacent to the first film layer to provide color and/or images in an aesthetically pleasing manor, and to protect the subsequent layer from damaging UV light exposure. An embossing resin layer is disposed adjacent to the ink layer to improve the fire worthiness of the laminate by being situated adjacent to the exterior surface of the laminate. A second film layer is disposed adjacent to the embossing resin layer and a surface of the sidewall. The location of the embossing resin layer enhances the fire worthiness of the laminate by operating to absorb thermal energy released by the sidewall in the event the sidewall is exposed to fire or to a high temperature sufficient to otherwise cause higher thermal energy release of a conventional laminate.

10 Claims, 4 Drawing Sheets

METHOD AND APPARATUS FOR FORMING A FIREWORTHY LAMINATE

CROSS-REFERENCE TO RELATED APPLICATIONS

The present application is related in general subject matter to pending U.S. patent application Ser. No. 10/882,047, filed Jun. 30, 2004, assigned to The Boeing Company, and hereby incorporated by reference into the present application. Additionally, the subject matter of the present application claims priority from U.S. Provisional Patent Application Ser. No. 60/688,414, filed Jun. 8, 2005, entitled "Method and Apparatus for Forming a Laminate with Improved Fire Worthiness," the disclosure of which is also hereby incorporated by reference into the present application, and U.S. Provisional Patent Application Ser. No. 60/688,413, filed Jun. 8, 2005, entitled "Method and Apparatus for Forming Fireworthy Laminate."

FIELD OF THE INVENTION

The present invention relates to laminates, and more particularly to a system and method for forming laminates with improved fire worthiness.

BACKGROUND OF THE INVENTION

Certain mobile platforms, such as aircraft, trains and automobiles, may generally employ laminate structures to form various surfaces. Laminate structures serve to provide visually appealing surfaces to the objective viewer. For example, in a commercial aircraft, a plurality of laterally aligned overhead stowage bin doors is typically included along the port and starboard sides of the passenger cabin of the aircraft. These stowage bin doors each generally include a laminate disposed on the front of the stowage bin door to create a visually appealing interface for the customer. Further, the sidewalls or other monuments in the passenger cabin may be lined with laminates to create a lightweight visually appealing surface. Advantageously, these laminates used for the sidewalls may also include patterns or other visually pleasing images. In addition, many other surfaces may be coated with a laminate to increase the visual appeal of the surface, such as doors, ceiling tiles and the like. Further, in some instances, laminates may also be used to display information to potential viewers, such as safety hazards or use instructions.

As many mobile platforms are subject to fire worthiness standards, it would be advantageous if the laminates could absorb thermal energy in the event of a fire. Such laminates could be affixed to any desired structure to reduce the amount of thermal energy released by the desired structure during a combustion event. Thus, the laminates may increase the fire worthiness of the desired structure while providing an aesthetically pleasing surface.

SUMMARY OF THE INVENTION

The present invention is directed to a laminate for forming an aesthetically pleasing, fire worthy exterior surface on an object, and is ideally suited for interior use in various mobile platforms and especially in commercial aircraft. The laminate comprises a first film layer which forms an exterior surface of the laminate. An ink layer is disposed adjacent the first film layer. An embossing resin layer is disposed adjacent the ink layer, to be proximate to the exterior surface of the laminate. A second film layer is disposed adjacent the embossing resin layer.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
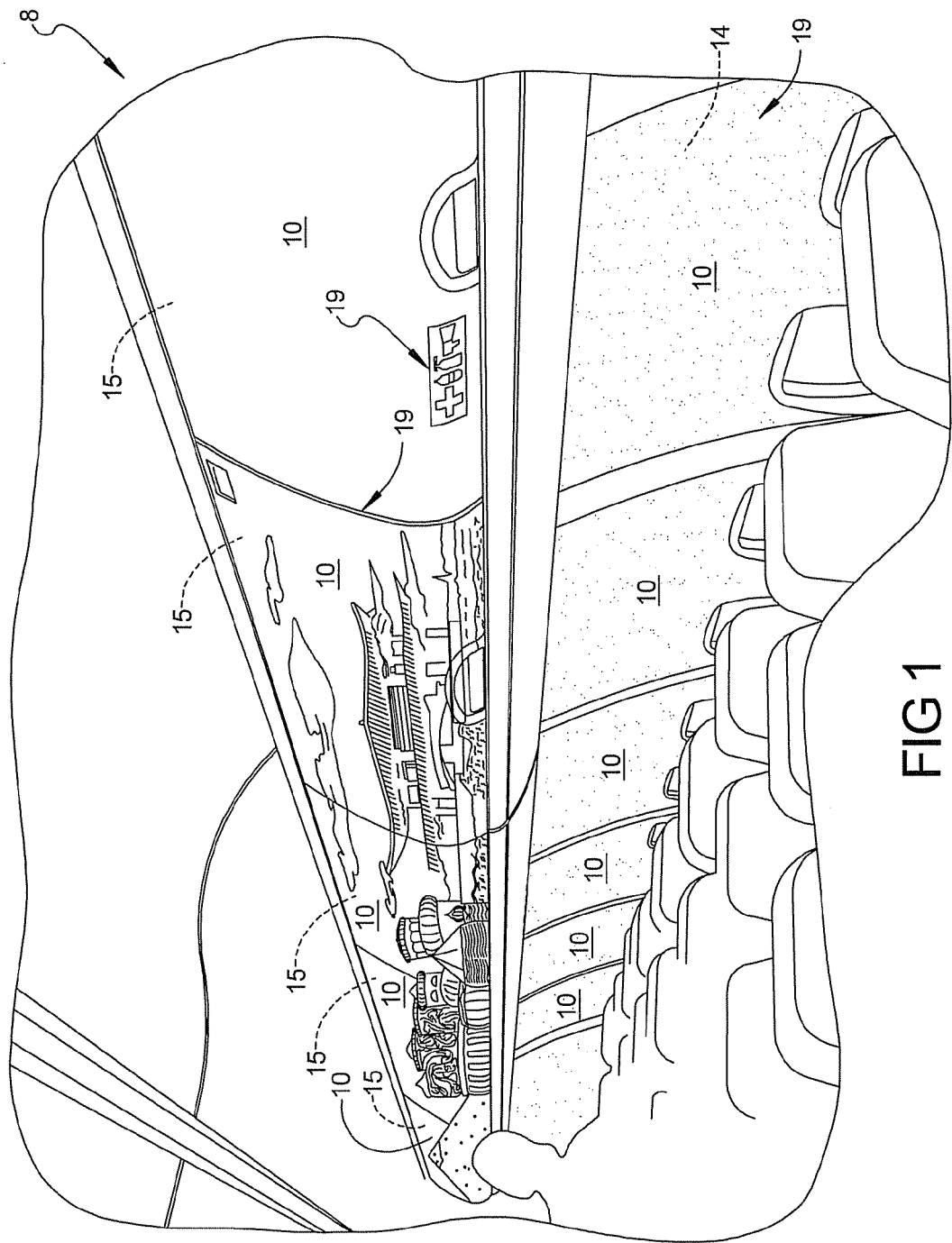
FIG. 1 is a simplified perspective view of a portion of an interior passenger cabin area of a commercial aircraft illustrating a laminate disposed on a sidewall and additionally on a plurality of overhead stowage bin doors of the interior passenger cabin, in accordance with a preferred embodiment of the present invention.
Figure 2:
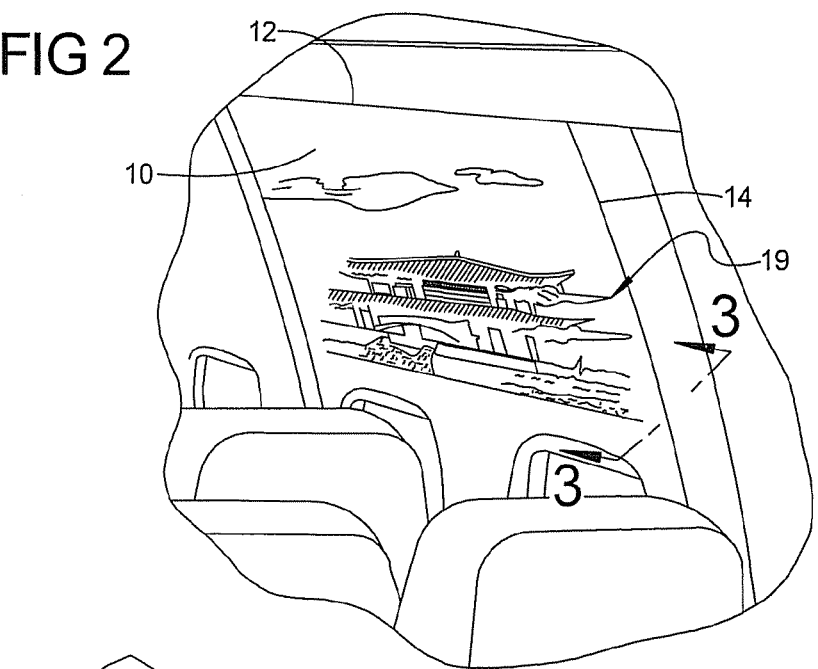
FIG. 2 is a perspective, enlarged view of a sidewall including a laminate according to the principles of the present invention.

Referring to FIGS. 1 and 2, there is shown a laminate 10. The laminate 10 may form an outer surface 12 of a suitable structure such as a panel or sidewall 14 on a mobile platform 8, however, the laminate 10 may be applied to the surface of any structure desiring an aesthetically pleasing surface such as a stowage bin door 15. In this example, the mobile platform comprises a commercial aircraft having a fuselage with an interior area 8a, seats 8b, ceiling panels 8c, a floor (not visible in the figure), etc. It will be appreciated that laminate 10 could be used to help form a variety of structural or decorative panels able to be used in a mobile platform, such as a train, automobile or aircraft, or even in a fixed (i.e., non-mobile) structure.

Figure 3:
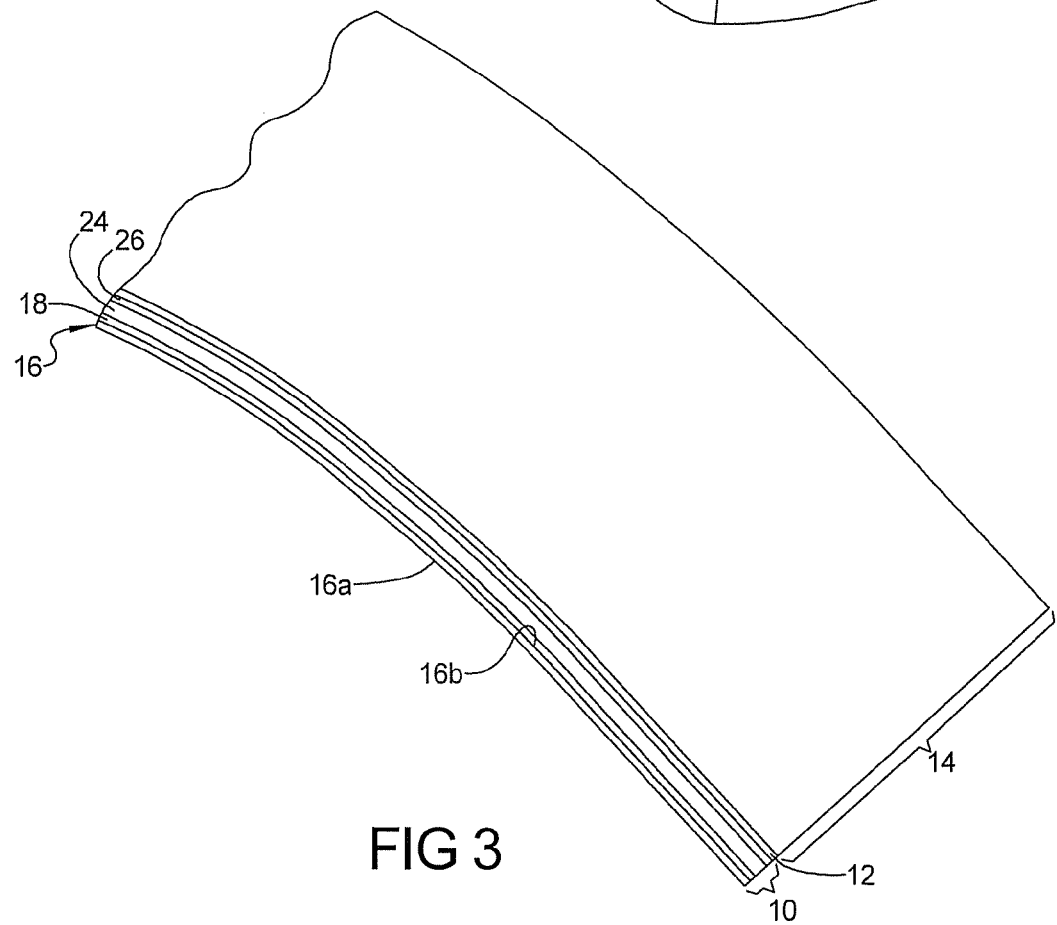
FIG. 3 is a side, cross sectional view of the surface of FIG. 2 taken in accordance with section line 3-3 in FIG. 2 showing the various layers of a fixed laminate secured to the sidewall.

With reference now to FIG. 3, laminate 10 is comprised of a first film layer 16. The first film layer 16, in one preferred form, comprises a very thin polyvinyl fluoride film, such as Tedlar® PVF film, having a thickness of preferably about one mil. The first film layer 16 is also preferably a clear gloss or a semi-gloss layer, but in either event it is substantially translucent or clear. Adjacent to the first film layer 16 is an ink layer 18.

Ink layer 18 represents the ink that may comprise an image 19. The ink layer 18 is formed on an inside surface 16b of the first film layer 16. This eliminates the need to place a protective, separate layer over the ink layer 18, since the first film layer 16, itself, forms a protective covering for the ink on its inside surface 16b. Ink layer 18 may be comprised of opaque, metallic or pearlescent ink which may be deposited by a suitable print technology, and more preferably by screen printing. Also, since the ink layer 18 is deposited on the inside surface 16b, it will be appreciated that the image 19 will need to be transposed during the printing process so that it appears correct when being viewed from the opposite side (i.e., outer surface 16 a) of first film layer 16.

The laminate 10 further includes a layer 24 comprised of an embossing resin and a second film layer 26. The second film layer 26 preferably comprises a very thin polyvinyl fluoride film, such as Tedlar® PVF film, having a thickness of preferably around two mils. Second film layer 26 is preferably white in color. The layer of embossing resin 24 may vary significantly, but in one preferred form comprises an areal weight of 0.023 pounds/square foot ($lb/ft^2$) to 0.031 $lb/ft^2$.

The laminate 10 is formed in a conventional multi-opening press which uses heat and pressure to consolidate the individual layers making up laminate 10 together as a single, decorative, laminate structure. A texture of some kind may be imparted into the laminate as to be clearly visible on outer surface 16a of the first film layer 16. The texture is maintained by the embossing resin of layer 24 as the resin cures in the multi-opening press during manufacture.

With reference to Table 1 below, test data is shown illustrating the improved fire worthiness of the laminate 10 incorporating the embossing resin layer 24 adjacent to the ink layer 18. The samples below were tested according to Ohio State University Heat Release Test Method. There are two main requirements for federal fire worthiness, the peak release value must be below 65 kilowatts per square meter (kW/sq meter), and the two minute total heat released must be below 65 kilowatt minute per square meter (kW-min/sq meter). The values below are given in percent reduction in heat release as compared to baseline laminates. Baseline 1 is a laminate similar to laminate 10 except layer 24 and 26 are transposed (layer 26 is now in contact with ink layer 18) and the first film layer 16 has a heat seal adhesive applied to inside surface 16b. Baseline 2 is similar to Baseline 1 except for the addition of another film layer (third film layer) disposed to the outside surface of embossing layer 24. The third film layer is the same material as layer 26. Values are given for a laminate 10 incorporating a second film layer 26 (indicated as "NG-Dec" in Table 1) formed of polyvinyl fluoride film, such as a Tedlar® PVF film (PVF), fluorinated ethylenepropylene (FEP), or tetrafluoroethylene, hexaflouropropylene and vinylidene fluoride (THV™) as will be described in greater detail below.

TABLE 1

Test Data for Laminate Panel with Embossing Resin Layer Adjacent to First Film Layer

| Laminate Construction | OSU Peak Heat Release (% Reduction From Baseline) | | OSU 2-min Total Heat Release (% Reduction From Baseline) | |
|---|---|---|---|---|
| (Back Film) | Baseline 1 | Baseline 2 | Baseline 1 | Baseline 2 |
| NG-Dec (PVF) | 16.4 | 19.0 | 18.2 | 22.4 |
| NG-Dec (FEP) | 36.1 | 38.1 | 36.4 | 39.7 |
| NG-Dec (THV) | 44.3 | 46.0 | 41.8 | 44.8 |

Thus, by placing the embossing resin layer 24 closer to a possible source of flame (i.e., the outside surface 16a of the laminate 10) the embossing resin layer 24 serves to slow the combustion process and reduce the intensity of the burn, resulting in a reduced heat release value for the laminate 10.

The decorative textured laminate 10 may then be secured to the desired outer surface 12 through various techniques, such as the use of spray adhesive, layer 28, applied to the outer surface 12 and through the use of an infrared (IR) oven to form the laminate 10 to the outer surface 12 of sidewall 14. Some trimming of excess material or edge wrapping of laminate 10 may be required to achieve maximum aesthetic appeal.

Figure 4:
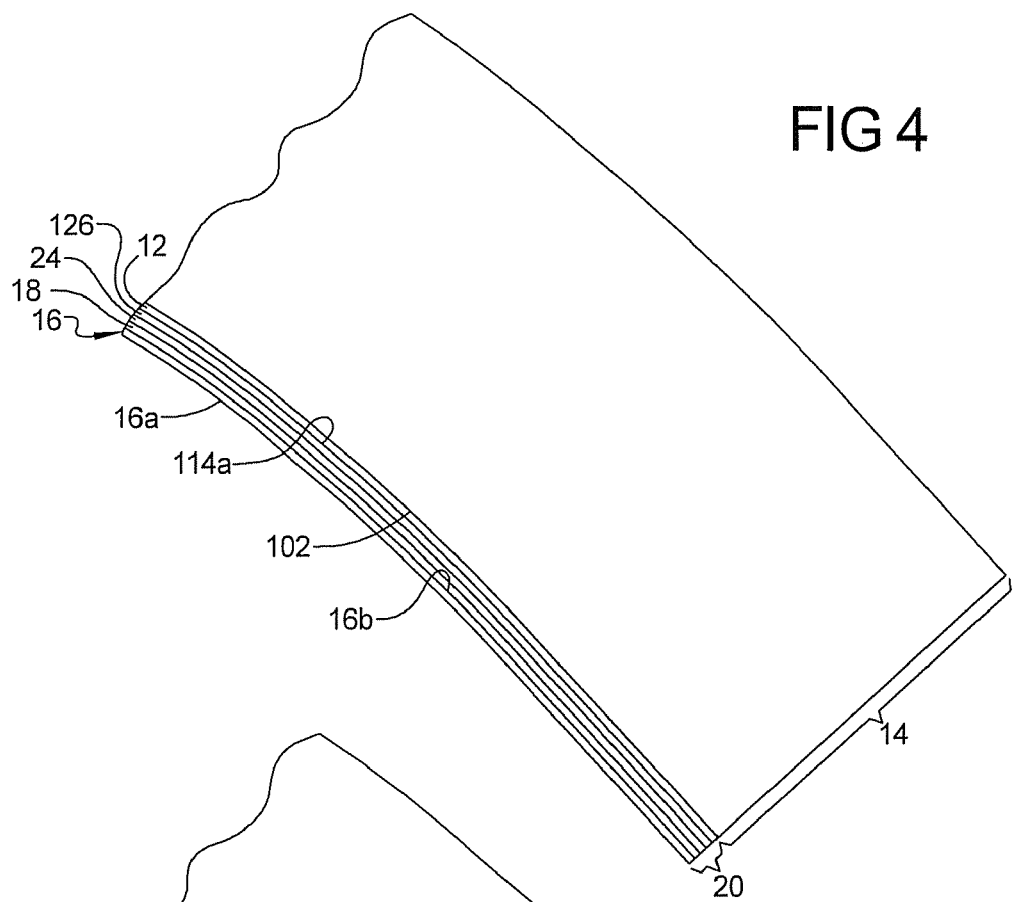
FIG. 4 is a side, cross sectional view of the sidewall of FIG. 2 taken in accordance with section line 3-3 in FIG. 2 showing the various layers of the fixed laminate of FIG. 1 according to an alternate embodiment.

An alternate composition of the laminate 10 is shown as laminate 20 in FIG. 4. As only the composition of the second film layer 126 has been altered, only this feature will be discussed. The second film layer 126 may comprise tetrafluoroethylene, hexaflouropropylene and vinylidene fluoride (THV™) to further reduce the heat released by the laminate 10. The use of THV™ film reduces the heat released by the laminate 10 because the chemical composition of the THV™ film creates a material with desirable physical properties while providing a high Limiting Oxygen Index (LOI) material. The LOI is a measurement of the minimum percentage of oxygen required to sustain ignition and combustion. Generally, materials with a high LOI, such as an LOI of greater than 30 percent, are considered to be self-extinguishing polymers. THV™ film generally has a LOI greater than 75%.

The second film layer 126 may generally be opaque, white, and generally has a thickness of two mils, however, slight variation in thickness and color may be employed. Similar to the laminate 10, the second film layer 126 may be disposed adjacent to the embossing resin layer 24, and the alternative laminate 20 may also be formed in substantially the same way as the laminate 10.

Figure 5:
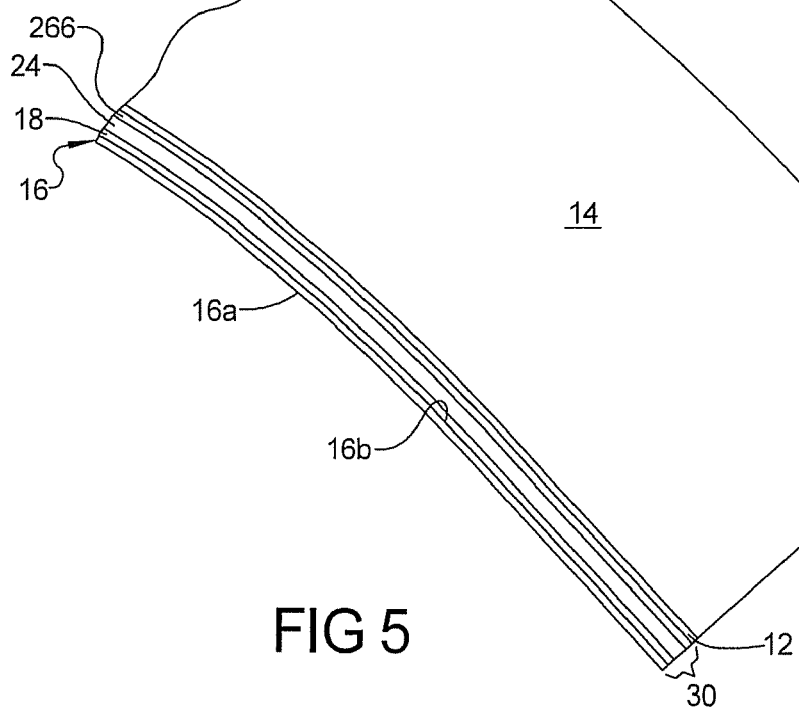
FIG. 5 is a side, cross sectional view of the sidewall of FIG. 2 taken in accordance with section line 3-3 in FIG. 2 showing the various layers of the fixed laminate of FIG. 3 according to a second alternate embodiment.

A second alternate composition of the laminate 10 is shown as laminate 30 in FIG. 5. As only the composition of the second film layer 226 has been altered, only this feature will be discussed. The second film layer 226 may comprise fluoroethylene-propylene (FEP) to further reduce the heat released by the laminate 10. The use of FEP film reduces the heat released by the laminate 10 because the chemical composition of the FEP film creates a material with desirable physical properties while providing a high Limiting Oxygen Index (LOI) material. The LOI is a measurement of the minimum percentage of oxygen required to sustain ignition and combustion. Generally, materials with a high LOI, such as an LOI of greater than 30 percent, are considered to be self-extinguishing polymers. FEP film generally has a LOI greater than 95%.

The second film layer 226 may generally be opaque, white, and generally has a thickness of two mils, however, slight variation in thickness and color may be employed. Similar to the laminate 10, the second film layer 226 may be disposed adjacent to the embossing resin layer 24, and the alternative laminate 30 may also be formed in substantially the same way as the laminate 10.

Figure 6:
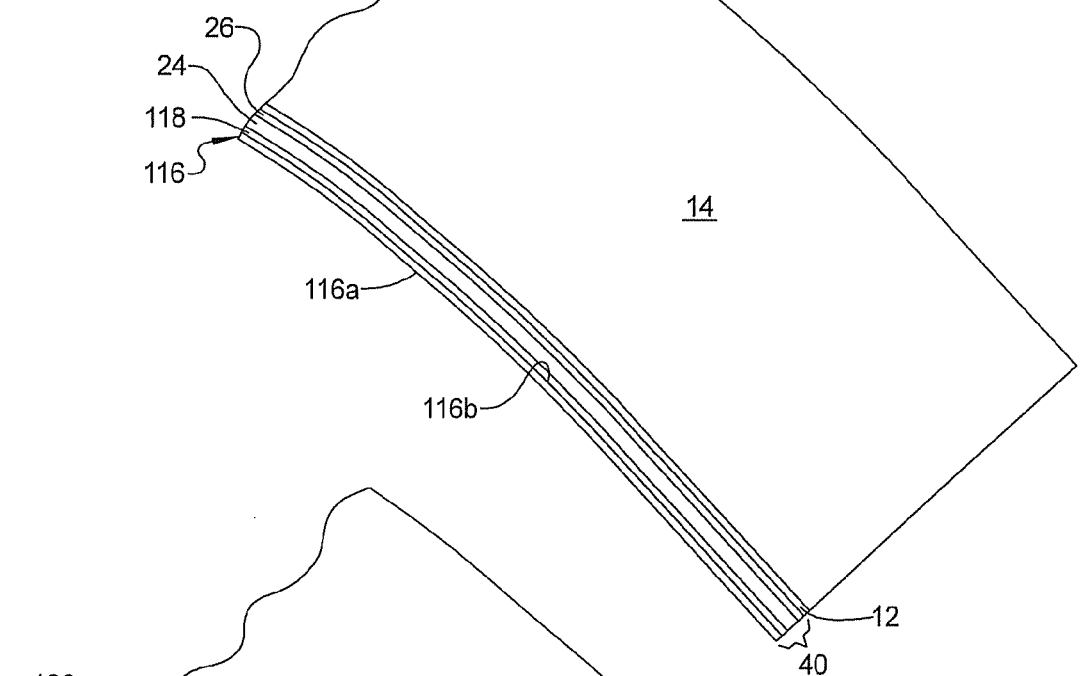
FIG. 6 is a side, cross sectional view of the sidewall of FIG. 2 taken in accordance with section line 3-3 in FIG. 2 showing the various layers of the fixed laminate of FIG. 3 according to a third alternate embodiment.

With reference now to FIG. 6, a third alternate laminate 40 is shown. The laminate 40 is similar to laminate 10. The laminate 40 includes a first film layer 116 having a first side 116a which forms the outside surface of the laminate 40. The first film layer 116 is generally comprised of substantially transparent polyvinyl fluoride film, such as a Tedlar® PVF film, having a thickness of approximately one mil and including an ultraviolet (UV) blocker. Adjacent to the first film layer 116 may be an ink layer 118. The ink layer 118 may be used to form the image 19 on the laminate 40, however, the ink layer 118 is optional. If included in the formation of the laminate 40, then the ink layer 118 may be comprised of UV cured ink jet ink which may be printed on a second side 116b of the first film layer 116 using any appropriate ink jet printer.

The ink used to form ink layer 118, which makes up the image 19, preferably comprises an ultraviolet (UV) curable and stable ink (black or colored) that is deposited directly on the first film layer surface 116b. The ink is cured virtually immediately after being deposited by the ink jet printer via a UV light associated with the digital ink jet printer that passes over the newly deposited ink just after the ink is deposited. The use of UV curable ink allows the ink to be deposited directly on the first film layer 116 without the need for some type of receptive coating to be placed over the first film layer 116, which would be necessary with water or solvent based digital ink jet inks. The ability of the UV curable ink to be cured virtually immediately after being deposited on the first film layer also simplifies and expedites the manufacturing of the laminate 40. In addition, UV curable inks allow ink loadings on the Tedlar® PVF in excess of 300% which is difficult, or impossible, to obtain using water or solvent based digital ink jet inks.

The laminate 40 further includes a layer 24 comprised of an embossing resin and a second film layer 26. The second film layer 26 also preferably comprises a very thin polyvinyl fluoride film, such as Tedlar® PVF film, having a thickness of preferably around two mils. Second film layer 26 is also preferably white in color. The layer of embossing resin 24 may vary significantly, but in one preferred form comprises an areal weight of 0.023 pounds/square foot (lb/ft$^2$) to 0.031 lb/ft$^2$.

As described above, the ink layer 118 is most preferably applied by a suitable ink jet printer or printing process. Companies making suitable ink jet printers or printing equipment are Vutek of Meredith, N.H. and Leggett & Platt Inc. of Jacksonville Beach, Fla. Other suitable inks are available from 3M Corp. of Minneapolis, Minn., and Sunjet of Bath, England. The color image formed by the image 19, in one preferred form, comprises a high contrast color image which is highly aesthetically pleasing to view.

If the ink layer 118 is employed in the formation of the laminate 40, then an embossing resin layer 24 may be positioned adjacent to the ink layer 118. Otherwise, the embossing resin layer 24 may be disposed against the first film layer 116. As the embossing resin layer 24 generally includes a fire retardant material as part of the formulation of the embossing resin, the embossing resin layer 24 may be layered closer to the outside surface 116 of the laminate 40 to improve the heat resistance of the material, as discussed previously. The embossing resin layer 24 may further be preferably white or opaque in color as the ink jet printing is a subtractive printing process which requires an opaque or white background to create the image 19. In addition, the use of the UV blocker in the first film layer 116 further serves to protect an ink jet printed image as without the UV blocker in the first film layer 116, the exposure of the laminate 40 to UV light may cause the embossing resin layer 24 to yellow over time.

The embossing resin layer 24 may be disposed adjacent to a second film layer 26. The second film layer 26 may generally comprise opaque or white polyvinyl fluoride film, such as a Tedlar® PVF film, having a thickness of approximately two mils.

The laminate 40 is formed in a conventional multi-opening press which uses heat and pressure to consolidate the individual layers making up laminate 40 together as a single, decorative, laminate structure. A texture of some kind may be imparted into the laminate as to be clearly visible on outer surface 116a of the first film layer 116. The texture is maintained by the embossing resin of layer 24 as the resin cures in the multi-opening press during manufacture.

Figure 7:
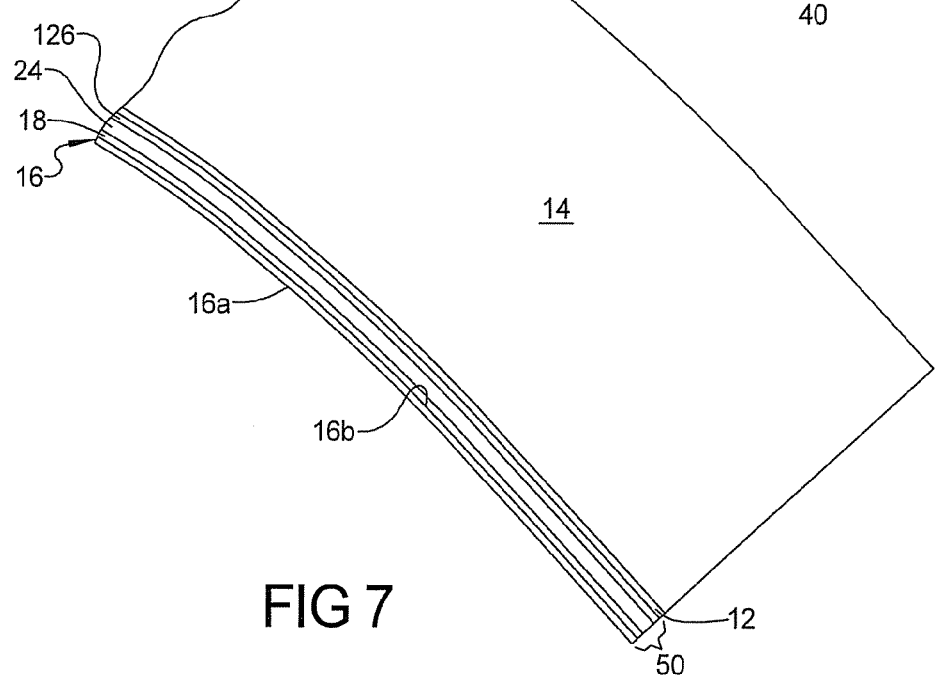
FIG. 7 is a side, cross sectional view of the sidewall of FIG. 2 taken in accordance with section line 3-3 in FIG. 2 showing the various layers of the fixed laminate of FIG. 3 according to a fourth alternate embodiment.

With reference to FIG. 7, a fourth alternate composition laminate 50 is shown. The alternative composition laminate 50 is substantially similar to the laminate 40, except the second film layer 126 is comprised of different material. Thus, only the altered composition will be discussed. The alternative composition laminate 50 includes a second film layer 126. The second film layer 126 may comprise tetrafluoroethylene, hexaflouropropylene and vinylidene fluoride (THV™) to further reduce the heat released by the laminate 40. The use of THV™ film reduces the heat released by the laminate 40 because the chemical composition of the THV™ film creates a material with desirable physical properties while providing a high Limiting Oxygen Index (LOI) material. The LOI is a measurement of the minimum percentage of oxygen required to sustain ignition and combustion. Generally, materials with a high LOI, such as an LOI of greater than 30 percent, are considered to be self-extinguishing polymers. THV™ film generally has a LOI greater than 75%.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of manufacturing a decorative laminate for improving the fire worthiness of a structure on a mobile platform, the method comprising:
   providing a first laminate component including a first film layer with an ink layer disposed directly on one side thereof;
   providing a second laminate component including a second film layer with an embossing resin layer disposed on one side thereof,
   the embossing resin layer including embossing resin that is fire retardant; and
   consolidating the laminate components with the embossing resin layer directly contacting the ink layer and the second film layer so that the second film layer may be directly coupled to the structure.

2. The method of claim 1, wherein providing a first laminate component comprises:
   applying the ink layer to the first film layer.

3. The method of claim 2, wherein the applying operation comprises applying the ink layer by ink-jet printing.

4. The method of claim 1, wherein providing a second film layer comprises disposing a polyvinyl fluoride (PVF) layer adjacent the embossing resin layer.

5. The method of claim 1, wherein providing a second film layer comprises disposing a fluoroethylene-propylene (FEP) layer adjacent the embossing resin layer.

6. The method of claim 1, wherein providing said first laminate component with a first film layer with an ink layer comprises using a metallic ink able to be screen printed on the first film layer.

7. The method of claim 1, wherein providing said first laminate component with a first film layer with an ink layer comprises using a pearlescent ink able to be screen printed on the first film layer.

8. The method of claim 1, wherein providing the first film layer comprises using a first film layer having an ultra-violet light blocking component.

9. A method of manufacturing a mobile platform comprising:

providing an interior panel for use within an interior area of a body portion of the mobile platform;

forming a fire retardant, printed, decorative laminate for disposing against the interior panel, the printed decorative laminate being formed by:

providing a first film layer that functions as a surface of the interior panel;

disposing an ink layer on the first film layer;

disposing an embossing resin layer into direct contact with the ink layer, the embossing resin layer including an embossing resin that is flame retardant;

disposing a second film layer into direct contact with the embossing resin layer with the second film layer being disposed directly against the interior panel.

10. A method of manufacturing a decorative laminate for improving the fire worthiness of a structure on a mobile platform, the method comprising:

providing a first laminate component including a first film layer;

applying an ink layer directly to one side of the first film layer;

providing a second laminate component including a second film layer that includes one of a polyvinyl fluoride (PVF) layer or a fluoroethylene-propylene (FEP) layer;

disposing an embossing resin layer directly onto the second film layer;

the embossing resin layer including embossing resin that is fire retardant; and consolidating the laminate components with the embossing resin layer contacting the ink layer so the second film layer may be coupled directly to the structure.

* * * * *